2,835,667

PREPARATION OF ENOL-ETHERS AND KETALS OF KETOSTEROIDS

Alberto Ercoli and Pietro de Ruggieri, Milan, Italy; said de Ruggieri assignor to Francesco Vismara Societa per Azioni, a company of Italy No Drawing. Application June 20, 1955
Serial No. 516,732

6 Claims. (Cl. 260—239.55)

This invention relates to a process for the preparation of 3-enol ethers and 3-cyclic ketals of ketosteroids which comprises reacting a ketosteroid with a mono- or polyhydric alcohol in boiling isooctane (2,2,4-trimethyl pentane) which removes continuously by distillation, as azeotropic mixture, the water formed during the reaction.

It has been known for many years that steroidal ketones may be converted into their 3-enol ethers or 3-cyclic ketals, by refluxing the ketone and a mono- or polyhydric alcohol in benzene, in the presence of an acid catalyst, the water being continuously removed by slow distillation.

According to the table A when the starting material is an unconjugated 3-ketone corresponding to Formula I, wherein S completes the steroid formula, by reacting with a bivalent alcohol, a 3-glycol ketal having the Formula II is obtained. When as starting material a α,β unsaturated 3-ketone, corresponding to Formula III, is employed, by reacting with a monovalent alcohol a 3-enol ether having the Formula IV is formed, whereas by reacting with a bivalent alcohol a 3-glycol ketal having the Formula V is obtained.

TABLE A

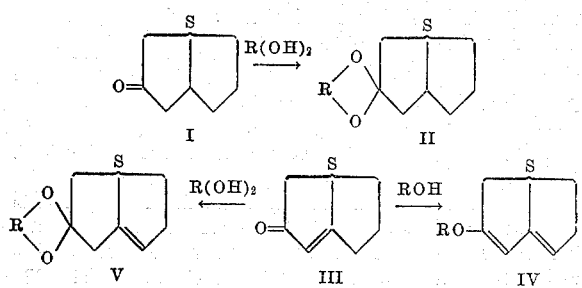

With the above procedure, according to the French Patent No. 876,816, the cyclic ketal derivatives, from ketosteroids, are obtained and according to the French Patent No. 875,070 the enol ether derivatives from α,β unsaturated 3-ketones are prepared.

Among the examples reported in these two patents the starting materials are cholestenone, androstenedione, testosterone, testosterone propionate, pregnenolone. As alcohols for the formation of enol ethers or cyclic ketals, cyclohexanol, cholesterol, butyl alcohol, benzyl alcohol, ethylene glycol, propanediol-1,3, are disclosed. As catalyst, p.toluensulfonic acid is used preferably. In the 13 examples as solvent for water entrainment, in azeotropic mixture, twelve parts of benzene and one part of carbon tetrachloride are considered.

Subsequently examples of such a procedure frequently appeared in the scientific literature, where the benzene is universally used as a solvent for water entrainment in azeotropic mixture.

This procedure is but a particular application of the general method by E. J. Salmi for the preparation of cyclic ketals.

A survey of the literature concerned with this reaction may be found in the paper of M. W. Cronyn and J. E. Goodrich in the J. Am. Chem. Soc. 74, 3331 (1952), and a reference to the application in the field of Δ4-3-ketosteroids may be found in the paper of Antonucci, S. Bernstein, M. Heller, R. Lehard, R. Little and S. H. Williams in the J. Org. Chem. 18, 70 (1953).

From the chemical literature on the application of benzene as an agent for water entrainment, it is possible to see that the yields given for the preparation of enol ethers or cyclic ketals of 3-ketosteroids are often very low.

Furthermore the applicants have noted that when using some steroidal ketones it is not possible to ensure the desired conversion, particularly when instead of the cyclic ketals (starting from bivalent alcohols) enol ethers (starting from monovalent alcohols) must be obtained.

The applicants have already taken into consideration the possibility of using other solvents instead of benzene, i. e. in the case of the 3-glycol ketal of 11-keto-progesterone-20-cyanohydrin preparation (paper presented to be published in the Gazz. Chim. Ital.) the reaction is carried out more advantageously in chloroform than in benzene.

The applicants have now found an improvement to the general method which makes it possible to increase appreciably the yields, when these are low and to obtain the desired compounds when, by the usual procedure, it is not possible to achieve any results.

According to the improvement of the present invention instead of benzene or carbon tetrachloride, as described in the two above mentioned patents, isooctane (2,2,4-trimethylpentane) is employed. This method makes it possible to make use of the very satisfactory properties of the isooctane as type-entrainer, in order to remove in the azeotropic mixture the water formed during the reaction, even if its dissolving power is negligible towards the water itself (the mutual immiscibility causes the condensate to separate rapidly and completely into two layers).

This property has been explained by the papers of J. Th. G. Overbeck and D. A. A. Mossel (Rec. Trav. Chim. Pays Bas 70, 63; 1951) and of D. A. Mossel and J. F. Reith (ibid. 297) which have chosen the isooctane as type-entrainer for a reference method for the determination of the water content of foods.

In carrying out the process of the present invention a ketosteroid is suspended or dissolved in pure isooctane, and treated with an excess of a mono- or polyhydric alcohol in the presence of the theoretical amount of p. toluensulfonic acid as catalyst. The mixture is refluxed employing an apparatus equipped in such a way that the isooctane, falling from the condenser, before returning to the flask, is freed from the water which it entrains, by means of a suitable trap supplied with an inner funnel containing drying agents such as activated silica gel or phosphorus pentoxide preferably mixed with a filter aid (celite and the like). In such a way, the water which forms little by little during the reaction is continuously removed.

Obviously instead of the isooctane alone may be used a mixture of isooctane i. e. with some halogenated solvents, having preferably a higher boiling point such as ethylene bromide, tetrachloroethane and the like. Particularly with the addition of the halogenated solvent the solubility of many steroidal ketones, practically insoluble in isooctane, may be increased and consequently the reactivity of the ketosteroid itself becomes easier.

On the other hand, if the halogenated solvent has a boiling point sufficiently higher than isooctane it does not distill out so that the mentioned properties of the isooctane, as type-entrainer, are not altered.

The method of the present invention makes it possible to obtain the 3-enol ethers of ketosteroids having the following general formula:

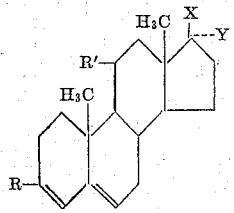

wherein R represents a radical of an alcohol or thioalcohol selected from the class consisting of aliphatic, cycloaliphatic and arylaliphatic alcohols or thioalcohols, wherein R' represents hydrogen, hydroxy, ketonic oxygen or an acyloxy group, wherein X represents hydroxy, an acyloxy group, an acetyl group or an acyloxyacetyl group, and wherein Y represents hydrogen, hydroxy, an acyloxy group, or a methyl group.

Analogously according to the method of the present invention may be prepared the 3-cyclic ketals of ketosteroids having the following general formula:

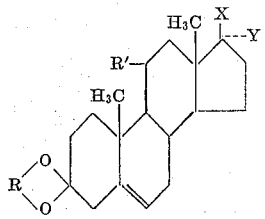

wherein R represents an alkylic radical from two to four carbon atoms, wherein R' represents hydrogen, hydroxy, ketonic oxygen, or an acyloxy group, wherein X represents hydroxy, an acyloxy group, an acetyl group or an acyloxyacetyl group, and wherein Y represents hydrogen, hydroxy, an acyloxy group, or a methyl group.

The following examples serve to illustrate the invention without, however, limiting it.

*Example 1*

To a suspension of 50 g. of testosterone 17-phenylpropionate (M. P. 114° C.) in 5.5 l. of pure isooctane (2,2,4-trimethylpentane) at B. P. 99° C., 25 cc. of benzyl alcohol and 2.5 g. of p. toluensulfonic acid are added. The mixture is refluxed for 32 hours employing an apparatus (similar to that described in Org. Synt. 3, page 382) equipped in such a way that the isooctane falling from the condenser before returning to the flask, is separated from the water entrained by it, by means of a suitable trap supplied with an inner funnel containing phosphorus pentoxide mixed with a filter aid (celite and the like). After cooling, 10 cc. of pyridine are added in order to neutralise the p. toluensulfonic acid and the liquid is completely evaporated in the vacuum to dryness. The solid residue, recrystallised from methanol containing a little pyridine, is collected by filtration, washed with methanol-pyridine, and dried in the vacuum, thus obtaining 25 g. of 3-enol benzyl ether of testosterone 17-phenylpropionate; M. P. 129–131°. This 3-enol benzyl ether of 17-phenylpropionate of testosterone is a new and useful compound which has not been described in chemical literature. (When this step is carried out employing benzene instead of isooctane, within the same reaction time, only approximately 6 g. of 3-enol benzyl ether of testosterone 17-phenylpropionate are obtained.)

Similarly the 3-enol ethers of the following new compounds are so prepared:

| | Melting point, degrees |
|---|---|
| 3-enol benzyl ether of testosterone 17-propionate | 147–149 |
| 3-enol benzyl ether of 17-methyl-testosterone | 83–85 |
| 3-enol benzyl ether of progesterone | 185–186 |
| 3-enol benzyl ether of desoxycorticosterone-21-acetate | 158–160 |
| 3-enol benzyl ether of desoxycorticosterone-21-phenylpropionate | 124–126 |
| 3-enol isoamyl ether of testosterone 17-phenylpropionate | 76–78 |
| 3-enol cyclohexyl ether of testosterone 17-phenylpropionate | 120–121 |

*Example 2*

8 g. of the 11-ketoprogesterone-20-cyanohydrin (M. P. 157° C. dec.), prepared by treatment of 11-ketoprogesterone with acetone cyanohydrin, are added to 600 cc. of isooctane and treated with 8 cc. of ethylene glycol and 400 mg. of p. toluensulfonic acid.

The reaction mixture is refluxed for 5 hours employing the same apparatus described in Example 1. After cooling, the mixture is treated with 20 cc. of pyridine and the isooctane is removed by distillation under reduced pressure. The solid is treated again with 30 cc. of pyridine and the mixture is heated on the steam bath for 30 minutes and then diluted with hot water until crystallisation begins. After refrigeration overnight, the separated product is collected, washed with water and dried in the vacuum. By recrystallisation from methanol containing a trace of pyridine 7.8 g. (93%) of 3-ethylendioxy-11-ketoprogesterone, M. P. 170–171°, are obtained.

*Example 3*

In essentially the same manner as described in Example 1, but using ethylene glycol instead of benzyl alcohol, the 3-ethylene glycol ketals of the following compounds are prepared:

| | Melting point, degrees |
|---|---|
| 3-ethylene ketal of Reichstein's Substance S acetate | 268–270 |
| 3-ethylene ketal of cortisone acetate | 266–268 |
| 3-ethylene ketal of testosterone 17-phenylpropionate | 173–175 |
| 3-ethylene ketal of testosterone | 185–187 |
| 3-ethylene ketal of dehydrocorticosterone acetate | 193–194 |
| 3-ethylene ketal of testosterone benzoate | 219–221 |

Similarly, by using thiobenzyl alcohol instead of benzyl alcohol the 3-benzyl thioenol ether of testosterone 17-phenylpropionate melting at 123–125° is so obtained.

We claim:

1. A process for the preparation of derivatives of 3-ketosteroids, selected from the group consisting of 3-enol ethers and 3-cyclic ketals of the pregnane and androstane series wherein the 3-ketosteroid is reacted with an alcohol, selected from the group consisting of monovalent and divalent alcohols in the presence of an arylsulfonic acid as catalyst in boiling isooctane (2,2,4-trimethylpentane) which continuously removes, by distillation in azeotropic mixture, the water formed during the reaction.

2. A process as claimed in claim 1 wherein a mixture of isooctane with a halogenated hydrocarbon solvent is used as the reaction medium.

3. A process for the preparation of enol ethers of 3-ketosteroids of the pregnane and androstane series wherein the 3-ketosteroid is reacted with a monovalent alcohol to form a 3-enol ether in boiling isooctane which continuously removes, by distillation in azeotropic mixture, the water formed during the reaction.

4. A process for the preparation of cyclic ketals of 3- ketosteroids of the pregnane and androstane series wherein the 3-ketosteroid is reacted with a divalent alcohol to form a 3-cyclic ketal in boiling isooctane which continuously removes, by distillation in azeotropic mixture, the water formed during the reaction.

5. A process as claimed in claim 3 wherein a mixture of isooctane with a halogenated hydrocarbon solvent is used as the reaction medium.

6. A process as claimed in claim 4 wherein a mixture of isooctane with a halogenated hydrocarbon solvent is used as the reaction medium.

References Cited in the file of this patent

UNITED STATES PATENTS

| | | |
|---|---|---|
| 2,183,589 | Reichstein | Dec. 19, 1939 |
| 2,263,785 | Reichstein | Nov. 25, 1941 |
| 2,302,636 | Koster | Nov. 17, 1942 |
| 2,386,331 | Mescher | Oct. 9, 1945 |
| 2,521,586 | Levy | Sept. 5, 1950 |
| 2,555,344 | Kaufman | June 5, 1951 |
| 2,700,666 | Berstein | Jan. 25, 1955 |
| 2,707,184 | Hogg | Apr. 26, 1955 |